Figure 1:
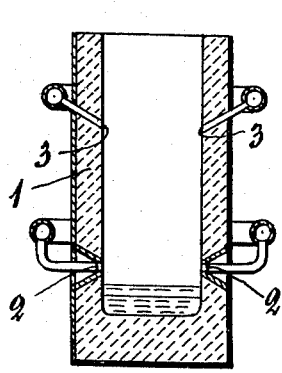

Oct. 16, 1956  F. M. WIBERG  2,767,080
PROCESS FOR REDUCING OXIDIC ORES
Filed Jan. 22, 1952

Inventor:
Frans Martin Wiberg
Pierce, Scheffler & Parker
his Attorneys.

United States Patent Office 2,767,080
Patented Oct. 16, 1956

2,767,080
PROCESS FOR REDUCING OXIDIC ORES

Frans Martin Wiberg, Stockholm, Sweden

Application January 22, 1952, Serial No. 267,565
Claims priority, application Sweden January 27, 1951

3 Claims. (Cl. 75—92)

This invention relates to a process for the reduction of ores, primarily iron ores, but it can also be applied when reducing ores of other metals. Its main purpose is to make the heating of a charge containing ore as well as carbonaceous reducing agents possible through combustion by air of gas passing through the charge, while substantially avoiding the oxidation of the carbon contained in the charge by the combustion gases or the air supplied for producing them.

For a long time efforts have been made to utilize the heat value of the combustible gas resulting from reduction processes for supplying at least part of the heat needed for the process and several reduction processes for producing pig iron or sponge iron based upon this principle have been suggested.

A difficulty arising in connection with all of these processes is that it is not possible to heat a charge consisting of a mixture of ore and carbonaceous reducing agent to a high temperature by burning combustible gas within the charge, because the carbon present in the charge would immediately reduce the carbonic acid and aqueous vapour formed during the combustion of the gas to carbon monoxide and hydrogen and the carbon would also burn up directly due to the oxygen in the air introduced for the combustion. Thus the main final result of the combustion would be that solid carbon would be burnt to carbon monoxide, instead of burning gas to carbonic acid and aqueous vapour.

Three main methods have been used in trying to avoid this difficulty:

1. The reduction is carried out in a rotating furnace and the gas developed from the charge, together with additional gas, oil or carbon powder is burned above the surface of the charge. Due partly to the comparatively insignificant contact surface between the charge and the combustion gases in a rotating furnace and partly to the incomplete contact between the charge and the combustion gases on account of the gases escaping from the charge, it is possible to burn the gas without simultaneous combustion of any considerable portion of the carbon contained in the charge by the oxidizing gases above the surface of the charge. This is the principle on which e. g. Krupp's "Rennverfahren" (German Patent 534,011) is based. Yet the unsatisfactory contact between the combustion gases and the charge involves certain heat-technical disadvantages. The furnaces must be of large size, which makes them expensive and involves great losses of heat.

2. The charge is enclosed in containers of refractory material which are heated from the outside by combustion of the gas evolved from the containers and additional gas supplied. The so-called Höganäs method for producing sponge iron invented by S. E. Sieurin (Swed. Pat. 31,079) functions according to this principle. Even in this case the furnaces have to be of large size which makes them expensive and, further the cost of the refractory containers adds another heavy expense.

3. Ore and carbon are not mixed before introduction into the furnace. In this case the ore can be heated by combustion of gas and can eventually at some later phase of the process be mixed with carbon for the final reduction, or the final reduction can be carried out by means of circulating reduction gas, or gas introduced from the outside. Several methods proposed have used this principle, e. g. the methods of Héroult (U. S. Pat. 815,293), Frick (Swed. Pat. 40,093), Fornander-Gröndal (Swed. Pat. 59,401), Norsk Staal (Norw. Pat. 42,213), Kalling (Swed. Pat. 73,868), Ekelund (Swed. Pat. 64,316), Fornander (Swed. Pat. 113,996) and the methods previously suggested by the inventor for producing sponge iron (Swed. Pat. 46,507) and electric pig iron (Swed Pats. 102,948 and 114,463). Although all these methods are correct in principle and some of them even have been found to function satisfactorily from a technical and economical point of view, yet they usually necessitate rather complicated and expensive equipment. This is why their use has been limited so far.

Carbon monoxide burning above the surface of the charge is obtained when producing pig iron or ferro alloys in open electric smelting furnaces, using ordinary charges consisting of a mixture of pieces of ore and carbon. Of course part of the heat thus developed benefits the charge, but only a very insignificant part of the quantity of heat developed in the flame can be thus utilized. In Journal of The Iron and Steel Institute, vol. 156, 1947, p. 260, column 2, lines 3–11, R. Durrer points out that if by blowing air "just below the top" into open electric smelting furnaces complete combustion of the gas could be obtained, the consumption of electric energy would go down to not more than 1000 kwh./ton pig iron instead of the 2500 khw./ton generally needed. Due to the above described difficulty of burning gas in an ordinary charge, in lines 32–48 of the same column Durrer suggests that the heating of the charge by means of gas combustion should take place in a rotating furnace, after which the pre-heated and pre-reduced charge should be transferred to an electric smelting furnace. This process is correct in principle, but involves a complicated establishment with the disadvantages described above.

With the present process the above disadvantages are avoided when heating a charge containing both ore and carbonaceous reducing agents by burning gases produced in a special combustion chamber and passing through the charge, or by means of combustion by air passing through the charge by shielding the carbon contained in the charge from contact with the combustion gases used for heating the charge or the air supplied for producing them by surrounding the individual pieces of carbonaceous reducing agent or the bodies mainly consisting of a mixture of fine-grained ore and fine-grained carbonaceous material by a layer consisting of fine-grained ore and/or other fine-grained non-combustible charge materials (which consequently contain no free carbon, or at least only small quantities thereof). The layer if necessary is kept together by a binding-agent, so that it forms a solid, coherent crust which serves to protect the carbonaceous materials inside it from combustion, but is at the same time porous enough to allow the gas developed through the reduction processes etc. within the bodies to escape. Besides ore, e. g. lime, limestone and clay are suitable materials for this protective layer.

If bodies mainly consisting of a mixture of fine-grained ore and fine-grained carbonaceous material are to be used as cores of the charge material, these bodies can e. g. be produced as briquettes or by extrusion of the moist mixture according to some known method or by rolling pellets of the mixture in a revolving drum with or without the addition of a binding agent.

The outer layer of fine-grained ore and/or other fine-grained charge materials can be applied by any known means, e. g., by rolling the core material in a revolving drum while adding the fine-grained material which is to form the outer layer and maintaining a suitable moisture content, or by spraying a suspension of the fine-grained material upon the core material or by dipping the core material in such suspension. If necessary, even binding agents can be used.

In order to assure that an outer layer of fine-grained material really protects the carbonaceous material against combustion, the following four experiments have been carried out.

A crucible, about 60 mm. in diameter and 150 mm. deep, was filled with four different mixtures of iron ore and coke and heated to 1000° C. in a furnace, producing a flame about 3–5 cm. high above the surface of the charge. Air was blown in through a quartz pipe which extended down through the charge and ended about 25 mm. from the bottom of the crucible. The result was as follows:

*Experiment 1.*—Mixture of pieces of ore and coke about 8–10 mm. grain size. When blowing in air the flame just about doubled its size.

*Experiment 2.*—Pellets, about 8 mm. in diameter, consisting of a mixture of fine-grained ore and fine-grained coke, but with no outer layer of fine-grained ore. When blowing in air the flame dwindled somewhat, but could not be made to disappear.

*Experiment 3.*—Pieces of coke of about 8–10 mm. with an outer layer of about 1 mm. of fine-grained ore. When blowing in air the flame disappeared completely, due to the fact that the gas was completely burned before reaching the upper surface of the charge.

*Experiment 4.*—Pellets about 10 mm. in diameter, consisting of cores about 8 mm. in diameter of a mixture of fine-grained ore and fine-grained coke and with an outer layer of about 1 mm. of fine-grained ore. When blowing in air the flame disappeared completely, like in Experiment 3.

These experiments show that it is possible to achieve the gas-combustion intended, if the carbonaceous material in the charge is protected by an outer layer of fine-grained ore, but is not possible in an ordinary charge, where the pieces of ore and coke are simply intermixed.

In order to clarify the principle of the invention the following illustrative examples are described, with reference to the accompanying drawings, which give schematic illustrations of suitable reducing furnaces.

In the accompanying drawings

Figure 2:
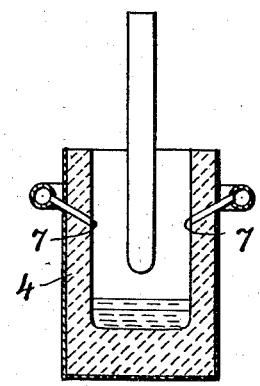
Figure 3:
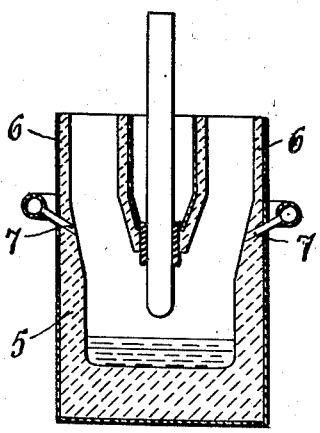
Figure 4:
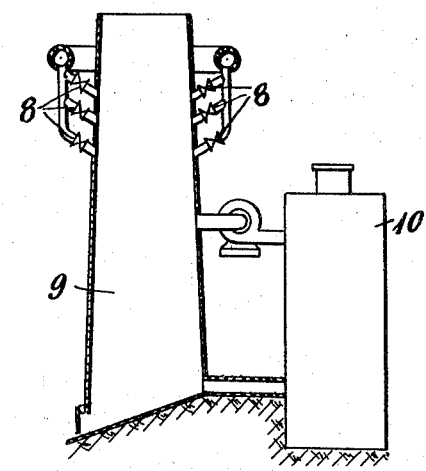

Fig. 1 is a diagrammatic illustration of a shaft furnace similar to a blast furnace, Fig. 2 is a diagrammatic illustration of an open-type electric smelting furnace, Fig. 3 is a diagrammatic illustration of a closed-type electric smelting furnace, and Fig. 4 is a diagrammatic illustration of a sponge iron furnace.

*1. Adaptation of the invention to furnaces of blast-furnace type*

The charge is made up of pieces of carbonaceous material or bodies mainly consisting of a mixture of fine-grained ore and fine-grained carbonaceous material, surrounded by an outer layer of fine-grained ore and/or other fine-grained charge material. If the ore consists of pieces of carbonaceous material, an intermediate layer, mainly consisting of a mixture of ore and carbonaceous material can be applied so as to facilitate the direct reduction with solid carbon, which has to take place in certain cases. If the carbonaceous material is sulphurous (e. g., coke), a layer of some sulphur-absorbing material can be applied immediately upon the pieces of carbonaceous material, or the sulphur-absorbing material can be mixed with the carbonaceous material in the bodies or in the intermediate layer.

The furnace of Fig. 1 has a shaft 1, of mainly the same type as an ordinary blast-furnace with openings 2 for introducing air and/or oxygen gas into the lower part of the furnace, where solid carbon is burnt to carbon monoxide for obtaining the heat necessary for smelting pig iron and slag and for final reduction of the charge. Due to the character of the charge material and the favourable reducing conditions offered by the present process the furnace can be of considerably smaller size than an ordinary blast-furnace and may be of the type known as a low shaft furnace. The furnace according to Fig. 1 differs from the ordinary blast-furnace or the ordinary low shaft furnace inasmuch as openings 3 have been provided at one or more levels in the top part of the furnace for introducing air for the combustion of at least part of the gas in order to achieve swift heating of the charge to reducing temperature. The additional heat obtained through the combustion of the gas is particularly valuable if the charge material is introduced in moist condition or if the combustion in the lower part of the furnace is carried out with oxygen gas or air enriched in oxygen, as the quantity of gas in the furnace will not be sufficient for heating the charge in the top part of the furnace to reducing temperature without gas combustion in that part.

If by means of gas combustion the charge is heated to a temperature which allows direct reduction of the ore with solid carbon inside the individual pieces of the charge to begin already in the combustion zone in the top part of the furnace, combustible gas will penetrate through the porous protective layer surrounding the pieces. Then even this gas can partly or entirely be burnt by the air introduced.

*2. Adaptation of the invention in an electric smelting furnace*

The charge is composed of pieces of carbonaceous material or bodies mainly consisting of a mixture of fine-grained ore and fine-grained carbonaceous material, surrounded by an outer layer of fine-grained ore and/or other fine-grained charge material. If the core consists of pieces of carbonaceous material, the kind of intermediate layer described for embodiment 1 above can be applied.

The furnace is either an open electric smelting furnace 4 (Fig. 2), of the type used for producing ferroalloys, or a closed electric smelting furnace 5 (Fig. 3), of the type generally used for producing electric pig, provided with a supply shaft 6 for the charge. Air is blown into the top part of the furnace or into the supply shaft through openings 7 at one or several levels, for combustion of the gas formed in the lower part of the furnace through reactions between the carbonaceous material and ore or other charge materials under the influence of the electric heating of the charge. If heating of the charge by means of gas combustion is driven to a temperature which allows such reactions to take place in the combustion zone in the top part of the furnace, combustible gas will penetrate through the outer porous protective layer which surrounds the pieces of charge material. In that case even that gas can entirely or partly be burnt by the air supplied.

*3. Adaptation of the invention upon the sponge iron process, or heating of the charge without smelting reduction*

The charge is composed of pieces of carbonaceous material or of bodies mainly consisting of a mixture of fine-grained ore and fine-grained carbonaceous material, surrounded by an outer layer of fine-grained ore and/or other fine-grained charge materials. If the charge consists of pieces of carbonaceous material, e. g. coke, charcoal, graphite, granulated pig iron, etc., the same kind of intermediate layer as described in embodiment 1 above, can be applied.

The furnace (Fig. 4) can be a furnace for producing sponge iron according to some known process in which the ore is heated by introducing air through openings 8 at one or several levels for burning by means of air the gas formed in another part of the furnace as surplus gas during the reduction of the ore. In such processes it is often difficult to find profitable use for all the heat developed through the combustion of the surplus gas or through the exothermic reduction with carbon monoxide. According to the present invention such surplus heat can be used for direct reduction of part of the ore with the solid carbon inside the pieces of the charge material. By means of such direct reduction combustible gas is developed and penetrates through the outer porous layer of the pieces of charge material. Then even this gas can entirely or partly be burnt up by the air introduced. The heating of the charge material can also take place through combustion of other gases or other combustion material supplied from the outside, in which case combustion can also take place in a separate furnace.

The process previously proposed by the inventor for producing sponge iron (Swed. Pat. 46,507) was chosen as an example in Fig. 4. This figure is a schematic illustration of a shaft furnace for carrying out this process. According to the original process only ore is introduced into shaft 9, all carbon being placed in the carburettor 10. According to the present process only part of the carbon is placed in carburettor 10, the rest is found inside the charge material described above, which is charged in shaft 9. This makes a very essential difference, as according to the new process the reduction of the ore can begin already in the combustion zone in the top part of the furnace, utilizing the surplus heat which otherwise would have been wasted. Besides it is a great advantage that the reduction begins in the inside of the pieces as otherwise the central part of a piece or body would need the longest reducing time. By transferring part of the carbon needed from carburettor 10 to shaft 9 the quantity of circulating gas needed diminishes as well as the need of electric heat supply for the carburettor.

Thus the present process offers increased production as well as diminished power consumption. Similar advantages are obtained when adapting the process upon other known sponge iron processes. It might be considered a disadvantage that ashes as well as the sulphur contained in the carbonaceous material enclosed in the charge remain in the sponge iron, but this can be eliminated e. g. by using carbonaceous material of low ash and sulphur content or by adding some sulphur-absorbing material, e. g. lime and subjecting the product to magnetic separation or the like.

The process according to the invention can also with advantage be used for producing alloys. In such cases bodies with a core of a mixture of solid reducing agent and ore of one or several alloying elements will be used as charge material, while the protective layer consists of fine-grained ore or oxide of some other alloying element. In this case as in some other embodiments of the methods according to the invention described earlier even pig iron powder can be used e. g. in granulated form where the carbon content of the pig iron serves as solid reducing agent.

I claim:

1. In the process for the reduction of oxidic ore in which the ore and a solid carbonaceous reducing agent pass downwardly through a preheating zone and then through a reducing zone and furnace gases generated in the reducing zone pass upwardly through the preheating zone, the improvement which consists in the combination of supplying at least part of the ore to the preheating zone in the form of thin coatings thereof in finely divided form on the surfaces of grains comprising the carbonaceous reducing agent and introducing air into the preheating zone so as to at least partially burn the ascending furnace gases, the ore coatings protecting the reducing agent from being burned through direct contact with the air introduced in the preheating zone and presenting a large surface of the ore to contact with the ascending furnace gases.

2. Process as defined in claim 1 in which the grains comprising carbonaceous reducing agent consist of said carbonaceous reducing agent.

3. Process as defined in claim 1 in which the grains comprising carbonaceous reducing agent contain also finely divided ore.

References Cited in the file of this patent

UNITED STATES PATENTS

| Number | Name | Date |
|---|---|---|
| 406,210 | Graff et al. | July 2, 1889 |
| 768,553 | Baxeres De Alzugaray | Aug. 23, 1904 |
| 981,280 | Jones | Jan. 10, 1911 |
| 1,054,051 | Steese | Feb. 25, 1913 |
| 1,148,782 | Kilbourn | Aug. 3, 1915 |
| 1,215,857 | Rebert | Feb. 13, 1917 |
| 1,551,554 | Griner | Sept. 1, 1925 |
| 2,082,359 | Schumacher | June 1, 1937 |
| 2,127,633 | Najarian | Aug. 23, 1938 |

FOREIGN PATENTS

| Number | Country | Date |
|---|---|---|
| 7,556 | Australia | May 30, 1917 |